March 20, 1934.     J. W. LIKLY     1,951,985
GARMENT FORM
Filed May 18, 1931     5 Sheets-Sheet 1

Inventor
James W. Likly,
By Subard Subard
his Attorneys March 20, 1934. J. W. LIKLY 1,951,985
GARMENT FORM
Filed May 18, 1931 5 Sheets-Sheet 2

Inventor
James W. Likly,

March 20, 1934.  J. W. LIKLY  1,951,985
GARMENT FORM
Filed May 18, 1931   5 Sheets-Sheet 5

Inventor
James W. Likly,
By Richard Richard
Attorney

Patented Mar. 20, 1934

1,951,985

UNITED STATES PATENT OFFICE 1,951,985

GARMENT FORM

James W. Likly, Cleveland, Ohio, assignor, by mesne assignments, to William H. Marlatt, Cleveland Heights, Ohio Application May 18, 1931, Serial No. 538,301

21 Claims. (Cl. 223—18.6)

This invention is a combined garment form and hanger, and has for its object primarily to provide a new and improved device of this character designed for use in hanging a garment in a closet or elsewhere, and also arranged for convenience in folding the garment and the form in such a manner as to maintain the garment in its tight folded condition while it is in a drawer or in a travelling bag of any character, whereby the garment will not become creased and wrinkled and will be found in good condition to wear without pressing after it has been removed from the drawer or from the travelling bag.

With these and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

Figure 1:
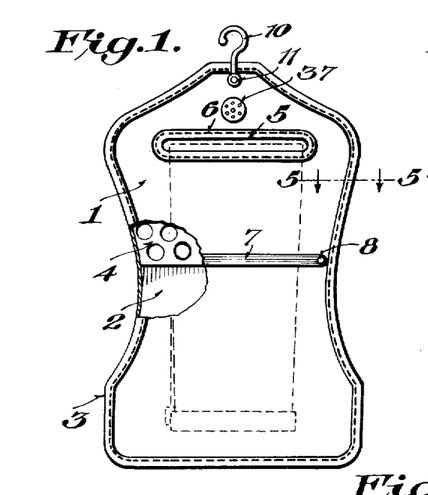
Figure 1 is an elevation of a combined garment form and hanger embodying the features of the present invention, parts being broken away to show the interior construction.
Figure 2:
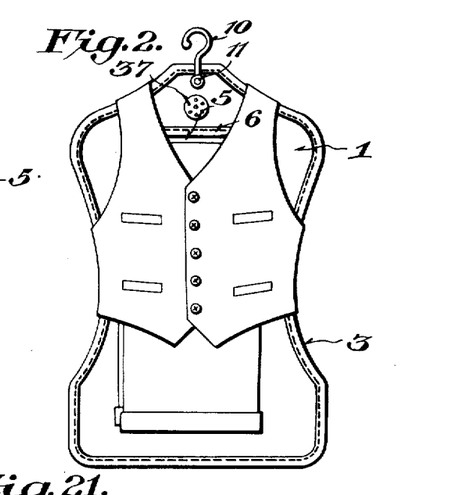
Figure 2 is a similar view showing a pair of trousers and a vest mounted on the device.
Figures 3, 21:
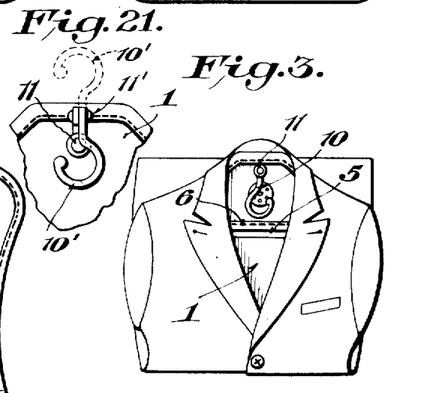
Figure 3 shows the device of Figure 1 with a coat thereon, the device being folded in half for convenience in packing the garment in a drawer or a luggage carrier.
Figure 21 is an enlarged fragmentary view illustrating another form of hanger hook.

Referring at first more particularly to Figure 1 of the drawings, it will be seen that the present garment hanger includes a body made up of opposite duplicate members designated 1 and 2, each consisting of some strong durable and flexible material bound together around their edges by a suitable binding 3. Within the upper portion of the hanger is a stiffener member 4 to stiffen the chest and shoulder portion of the hanger which is given a shape similar to that shown in the drawings so as to accommodate a vest as shown in Figure 2 and the neck and shoulder portions of a coat as shown in Figure 3. The stiffener element 4 extends for about one-half the length of the hanger, thereby leaving the lower half of the hanger in its normal flexible condition so that it may be folded back against either side of the shoulder portion of the hanger and along the lower edge of the stiffener element 4. A transverse slot or opening 5 is formed in the upper portion of the hanger, and the edges of the opening are provided with a suitable binding 6. The purpose of the slot 5 is to receive the leg portions of a pair of trousers, as indicated in dotted lines in Figure 1, and in full lines in Figure 2, the trousers extending through the slot and hanging down at opposite sides of the hanger. A retaining strap 7, of elastic or non-elastic webbing or other material is provided transversely across one side of the hanger at about the lower edge of the stiffening element 4. This strap is secured at opposite ends to the body of the hanger and is free therefrom throughout the major portion of its length so as to extend transversely across the trousers and hold them in place. If desired, both ends of the strap may be permanently secured to the holder, or one end may be provided with a snap fastener 8 so as to detachably connect one end of the strap to the holder, thereby to avoid the necessity of tucking the leg portions of the trousers downwardly between the strap and the body of the hanger. A suitable hook 10 has its shank portion pivoted as at 11 at the top of the longitudinal center of the hanger, and is intended for use in hanging the hanger on a hook or bar when it is desired to hang a suit of clothes in a closet or elsewhere. By having the hook pivoted, it may be turned down across the neck portion of the hanger body, as indicated in Figure 3, so as to avoid an external projection when it is desired to fold the hanger, with a suit of clothes thereon, and place them in a luggage carrier.

In using the device as illustrated in Figures 1 to 3 inclusive, the leg portions of a pair of trousers are passed through the opening 5 so as to hang down across opposite sides of the hanger with the retaining strap 7 extending transversely across the trousers. Then the vest is placed upon the hanger, as shown in Figure 2 of the drawings, the vest being buttoned or left unbuttoned according to the size of the vest. Then a coat is placed upon the hanger in the manner indicated in Figure 3 and the coat buttoned, thereby holding the vest and trousers snugly against the hanger, which may then be hung in a closet or elsewhere by means of the hook 10. If it is desired to pack the suit of clothes in a Gladstone bag, or other luggage carrier, the hanger with the suit thereon is placed on a table or the like with the front of the coat underneath. The sleeves are then folded across the back of the coat, and then the skirt of the coat, the lower portions of the trousers and the lower flexible portion of the garment hanger are folded upwardly along the lower edge of the stiffened upper portion of the hanger into the condition shown in Figure 3, the hook 10 of course being turned around so as to lie within the peripheral edge of the hanger, in which condition the several garments are folded snugly around a stiff central core accorded by the upper stiffened portion of the hanger, and when placed in a Gladstone bag or in a drawer, the garments will remain in their flat folded condition, and when subsequently removed and hung up in the usual manner, it will be found that the garments are practically free from wrinkles, and in any event such slight wrinkles as might have been formed will disappear after the garment has remained in a hanging condition or worn for a short while.

As thus far described, it will be understood that the device of the present invention includes an upper portion which is shaped to provide a central chest portion and opposite shoulder portions, and a lower or skirt portion which depends from and has a flexible connection with the upper portion. The flexible connection between the upper and lower portions enables the folding of the one portion upon the other portion so as to permit the use of the device as illustrated in Figure 3 of the drawings. The upper portion is made quite a bit stiffer than the lower or skirt portion so as to maintain the chest and shoulder portion of the garment extended and in an unwrinkled condition. The lower or skirt portion is not necessarily as stiff as the upper portion, thereby reducing the cost of manufacturing the device, but at the same time it is stiff enough to act as a core around which the skirt portion of the coat is wrapped and for which it constitutes a core to maintain the skirt portions of the coat in an unwrinkled condition when the device is folded as in Figure 3 and placed in a drawer or a traveling bag.

It will here be explained that the side edges of the body of the hanger are curved inwardly so as to accommodate the device to the shape of a vest and to enable the use of the hanger in coats of various sizes. For instance the shoulder or chest portion of the hanger may be made for a thirty-four size coat, which will of course accommodate a vest of any size, and if the coat is larger its opposite edges may be pulled inwardly until the opposite sides of the coat snugly engage and fold over the inwardly curved edges of the body of the hanger, and when the suit is folded in the manner shown in Figure 3, all of the parts will remain snugly in place folded around the core portion provided by the stiffened upper half of the hanger.

Figure 4:
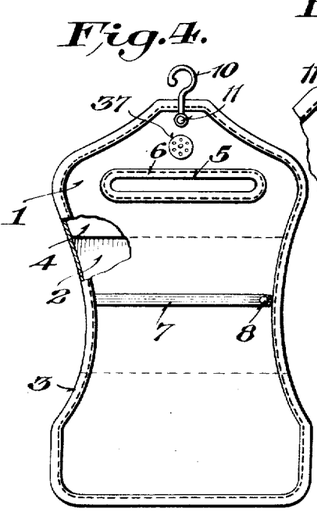
Figure 4 is a view similar to Figure 1 but arranged for double folding.

The device as illustrated in Figures 1, 2 and 3 is proportioned, with respect to the stiffened shoulder and chest portion of the device for use in a Gladstone bag, which size would be too large for an ordinary suitcase. In order that the device may be used in a suitcase, the stiffened upper portion, as shown in Figure 4, is shorter than the corresponding portion shown in Figure 1 and of a length to fit within a suitcase when the device with a suit of clothes thereon is given a double fold as shown in Figure 9 as distinguished from the single fold as shown in Figure 3.

Figure 6:
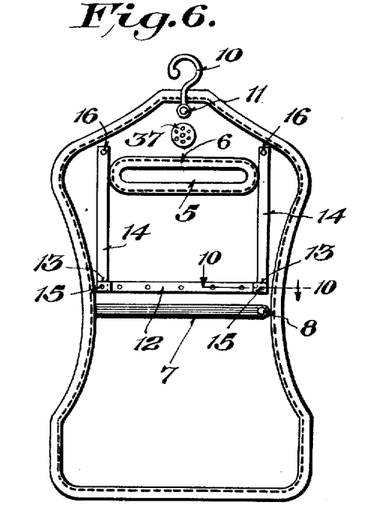
Figure 6 is a view similar to Figure 1 showing other means for stiffening the chest and shoulder portions of the device.
Figure 7:
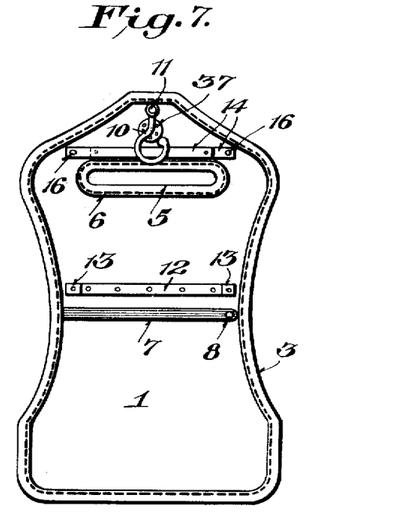
Figure 7 is a view similar to Figure 6 showing certain of the stiffening elements adjusted into positions to permit the rolling of the device into a roll.

In Figure 6 of the drawings there has been shown a slightly modified form of the invention, in that instead of using an interior stiffening element, such as shown in Figure 1 of the drawings, the entire body of the device is flexible and capable of being rolled into a roll, but is stiffened by means of a transverse stiffener bar 12 extending across one face of the body in the same relation as the lower edge of the stiffener element 4 in Figure 1 of the drawings. The stiffener may be of wood, metal or other material, and is riveted or otherwise rigidly secured to the body of the hanger. Preferably each end of the bar 12 is offset or spaced away from the body of the hanger as indicated at 13 so as to accommodate the lower end of an upright stiffener bar 14, the lower end of which is intended to lie between the offset adjacent end of the bar 12 and the body of the hanger. If desired a suitable detachable connection may be provided between the lower end of the bar 14 and the offset end of the bar 12, such for instance as a socket and projection detachable connection 15 constituting in effect a snap fastener connection. The upper end of each vertically disposed stiffener bar 14 is pivotally connected to the body of the hanger as at 16 at or about the upper edge of the slot 5, so that each bar 14 may have its lower end disengaged from the bar 12 and then swung around on its pivotal connection 16 into a folded position transversely across the body of the hanger as indicated in Figure 7 of the drawings, in which condition of the stiffener bars 14, the flexible body of the hanger may be rolled into a roll for convenience in storage and transportation. Otherwise the hanger is the same as that illustrated in Figure 1 of the drawings.

Figure 8:
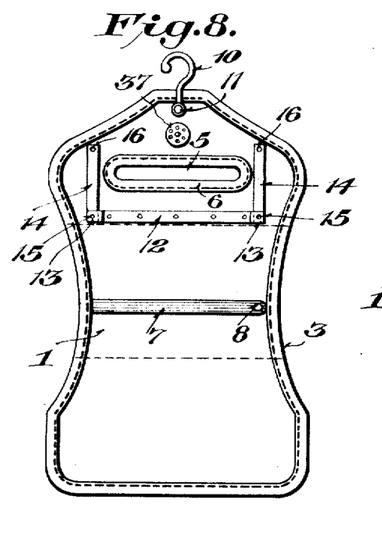
Figure 8 is a view similar to Figure 6 showing the stiffening elements disposed to enable double folding of the device.
Figure 9:
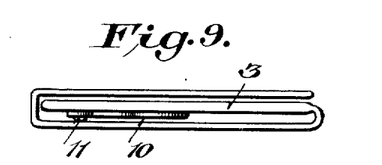
Figure 9 is an edge view showing the device in double folded condition.

Figures 6 and 7 of the drawings show the stiffener bar form of the device arranged for single folding, such as indicated in Figure 3 of the drawings, whereas Figure 8 shows an arrangement of stiffener bars designed for the double folding of the holder as indicated in Figure 9 of the drawings. In other words the transverse stiffener bar 12 of Figure 8 is elevated from its position in Figure 6 so as to lie about one-third of the length of the holder from the top edge thereof.

Figure 11:
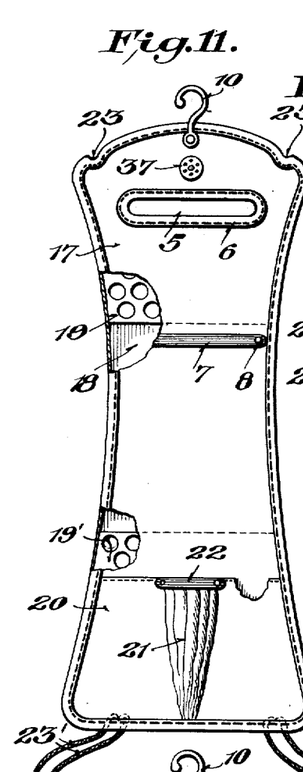
Figure 11 is a front elevation showing an embodiment of the invention for use in connection with ladies' dresses, parts being broken away to show interior constructions.
Figure 12:
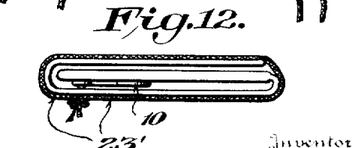
Figure 12 is an edge view of Figure 11 in folded condition.

In order to utilize the feature of the present invention for ladies' dresses I have embodied the invention in the form shown in Figure 11 of the drawings, wherein it will be seen that the body of the hanger is of course much longer than the body of the hanger designed for carrying men's suits. For the ladies' form of the device, the combined form and hanger includes front and back duplicate members 17 and 18 of suitable flexible material, an inner stiffener member 19 occupying the upper portion of the hanger and lying between the front and back members 17 and 18, and a lower stiffener member 19 occupying the lower portion of the hanger and lying between the front and back members 17 and 18, the intermediate portion of the combined form and hanger, which lies between the stiffener elements 19 and 19' being flexible so as to permit the folding of the body of the device along the lower edge of the stiffener element 19 and along the upper edge of the stiffener element 19'. The device is provided with the retaining strap 7 and also has the garment receiving slot 5 intended to receive a sport skirt or the like, which is capable of being folded into such proportions as to enable the passing of such a folded garment through the slot in the manner shown and described for the trousers in Figures 1 and 2 of the drawings. The bottom portion of the combined form and hanger may be provided with a pocket member 20 which conforms to the shape of the lower end of the body of the device and is secured to the latter at its edges, the top part of the member 20 of course being free from the body of the device thereby to define an open top pocket or receptacle between the body of the device and the pocket member 20. The pocket member 20 is provided at its middle with a gusset or the like 21, to enable expansion of the pocket member 20, there being a suitable elastic strap 22 connecting the opposite portions of the pocket member 20 across the top of the gusset. The combined form and hanger for ladies' dresses differs from the form and hanger for men's suits primarily in the fact that the body of the device is extended so as to have substantially the length of a dress. It is provided with a binding 3 and a pivoted hook 10, and is used by fitting the dress downwardly over the top end of the hanger until the shoulder portions of the dress engage the shoulder portions at the top of the hanger. It will be noted that the top end of the ladies' form of the device is shaped to accommodate the neck portion of a lady's dress, and is also provided with the notches or seats 23 to receive the shoulder straps of an evening dress or the like and prevent the same from slipping off of the top edge of the device. In folding the device, with the dress thereon preparatory to putting it in a travelling bag or drawer, the top portion is folded downwardly along the bottom edge of the stiffener element 19, and then the folded portions are folded downwardly along the top edge of the lower stiffener element 19, or the lower portion is folded upwardly along the upper edge of the stiffener element 19', from which it will be seen that the stiffener element 19 is disposed as a core in the middle of the folded garment, whereby the folded garment will be maintained in a flat condition and wrinkling of the garment is thereby effectually prevented. If desired, strings, tapes or the like 23' may be provided at the lower edge of the device for use as indicated in Figure 12 of the drawings to hold the device in its folded condition, the strings or tapes being passed around the device and the ends tied together.

Figure 13:
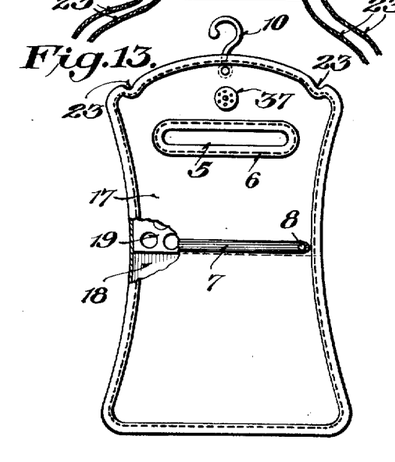
Figure 13 is an elevation similar to Figure 1 but showing the device shaped to accommodate a dress and proportioned for a short dress.

The form of device shown in Figure 11 is for a long dress, whereas the form of the device shown in Figure 13 is for a short dress, and is constructed and arranged the same as the men's form shown in Figure 1 except that the top edge portion of the body does not have the elevated neck portion of Figure 1 but is shaped to conform to the neck portion of a dress.

Figures 14, 15:
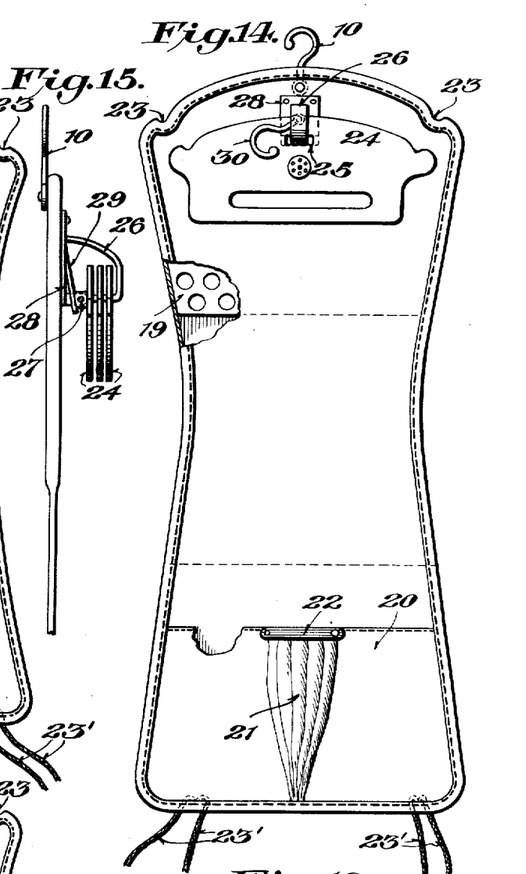
Figure 14 is a view similar to Figure 11 and showing an arrangement for supporting a plurality of dresses on a single device.
Figure 15 is an edge elevation of Figure 14.

For the purpose of hanging a plurality of dresses on a single device, I have provided the arrangement shown in Figures 14 and 15 which is identical with the form shown in Figure 11, but in addition thereto the device is provided with a pluralty of individual dress hangers 24, preferably of the form shown in Figure 14. Each individual hanger 24 has a slot or opening 25 therein to receive the flat tongue portion 26 of a supporting bracket, which, is pivoted at 27 upon a bracket plate 28 suitably secured to one side of the top portion of the device. The tongue 26 is held in its opposite positions by a leaf spring 29 provided upon the bracket plate 28 and arranged to have its free lower end portion bear against the pivoted end of the tongue and hold it in either of its opposite positions. Each individual hanger 24 is of course provided with a hook 30 for use in hanging the hanger on a bar or a hook in the closet when detached from the present device. When a plurality of dresses have been placed upon the individual hangers 24 and the latter mounted upon the present device, the latter may be folded along the inner edges of the stiffener elements 19 and 19' so as to fold the dresses within the device and to hold the dresses in a tight folded condition by reason of the stiffened ends of the device.

Figure 5:
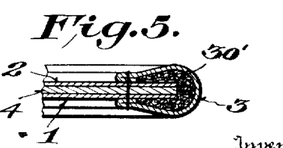
Figure 5 is an enlarged detail sectional view on the line 5—5 of Figure 1.

In order to avoid sharp edges which might mar or otherwise injure the garments, I have provided the binding 3 in the form shown in Figure 5 of the drawings, wherein it will be seen that the leather or other binding material 3 extends around a filling 30' of some soft material, which is arranged around the edge of the body of the hanger, thereby providing what might be termed a roll binding around the entire edge portion of the combined form and hanger. It will of course be understood that the same type of rolled binding may be employed around the edges of the slot 5.

Figure 16:
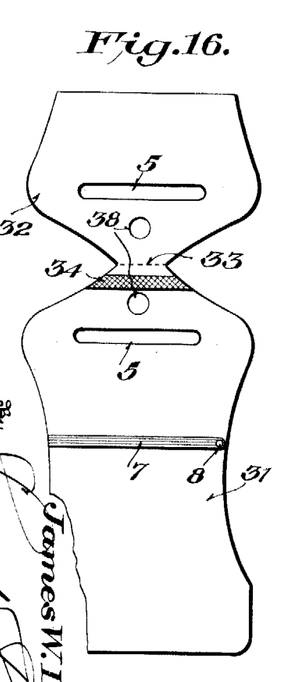
Figure 16 is a view similar to Figure 1 but showing an embodiment of the invention as made from a single sheet of heavy paper.
Figure 17:
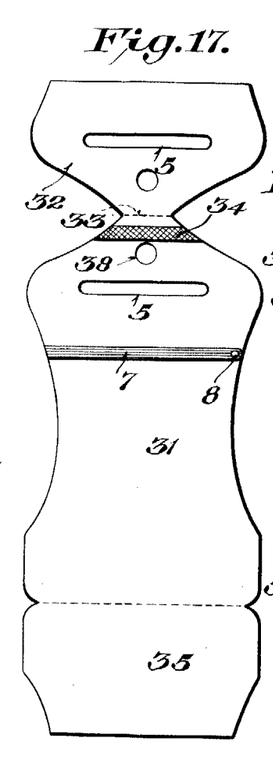
Figure 17 is a view similar to Figure 16 but showing the device arranged for double folding.
Figure 18:
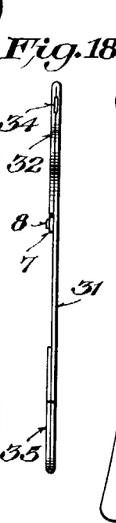
Figure 18 is an edge view of the form of the device as shown in Figure 17.

The present invention may be embodied in an extremely cheap form as shown in Figures 16 to 20 inclusive, wherein the device is shown as made from a single sheet or blank of heavy paper or the like. In Figure 16 the body portion 31 is a single or integral piece of stiff paper, of the general shape and configuration shown in Figure 1 of the drawings. In order to stiffen the chest and shoulder portion of the device, a stiffener element 32 is cut or stamped from the blank but integrally connected thereto at the neck portion 33, so that the stiffener element 32 may be folded down and glued to the body portion of the device in the position indicated in Figure 18 of the drawings, whereby the chest portion of the device may be given the desired stiffness. Before folding the stiffener element 32 in place, a piece of tape, webbing or other textile material 34 may be provided upon the neck portion of the device so as to produce a reinforcement of the neck portion such as will give adequate support for a hanger hook similar to the hook 10 shown in the other figures of the drawings. The body and the stiffener portion will of course have registered slots 5 for the accommodation of a pair of trousers, and the garment retaining strap 7 is also provided. Edge binding, as illustrated in Figure 5, may of course be employed, or it may be omitted as shown in the drawings. The form of the device shown in Figure 16 is for single folding, whereas the form of the device shown in Figure 17 is for double folding, the stiffener element 32' being somewhat shorter than the similar element 32, and the retaining strap 7 of course being moved up to the bottom edge of the stiffener element 32'. Also the body of the device is provided at its bottom with an integral stiffener portion 35 designed to be folded over against the bottom portion of the device and glued thereto, as shown in Figure 18 so as to stiffen the bottom portion of the body. In the form shown in Figures 17 and 18, the intermediate portion of the body is flexible and may be readily folded along the inner edges of the stiffener elements 32 and 35.

Figure 19:
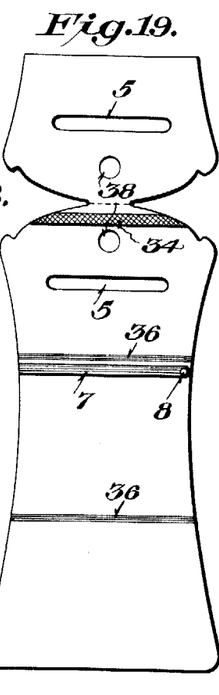
Figure 19 is a plan view of a paper blank form of the invention for the support of a long dress.
Figure 20:
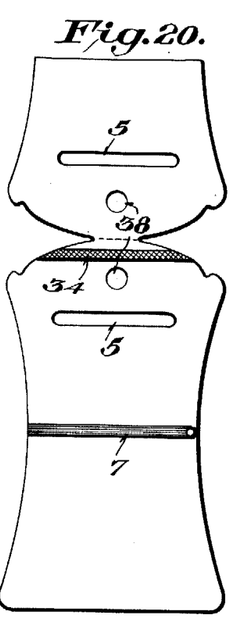
Figure 20 is a view similar to Figure 19 but showing the arrangement for a short dress.
Figure 22:
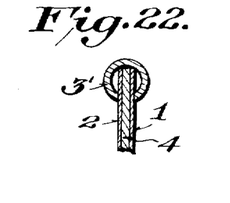
Figure 22 is an enlarged detail fragmentary section taken through the lower edge portion of the garment receiving slot and showing a modification of the roll binding.

For use in connection with dresses, the cheap paper form of the device has been shown in Figures 19 and 20, these forms differing from that shown in Figures 16 and 17 merely in the length or proportions of the device and in the neck and shoulder configuration thereof. If desired, the paper may be provided with transverse weakened portions 36, as by scoring the paper at the inner edges of the stiffened upper and lower portions of the device to facilitate folding at these places, should the paper be quite stiff and otherwise difficult to fold.

Figure 10:
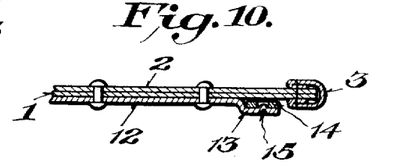
Figure 10 is an enlarged sectional view on the line 10—10 of Figure 6.
Figure 23:
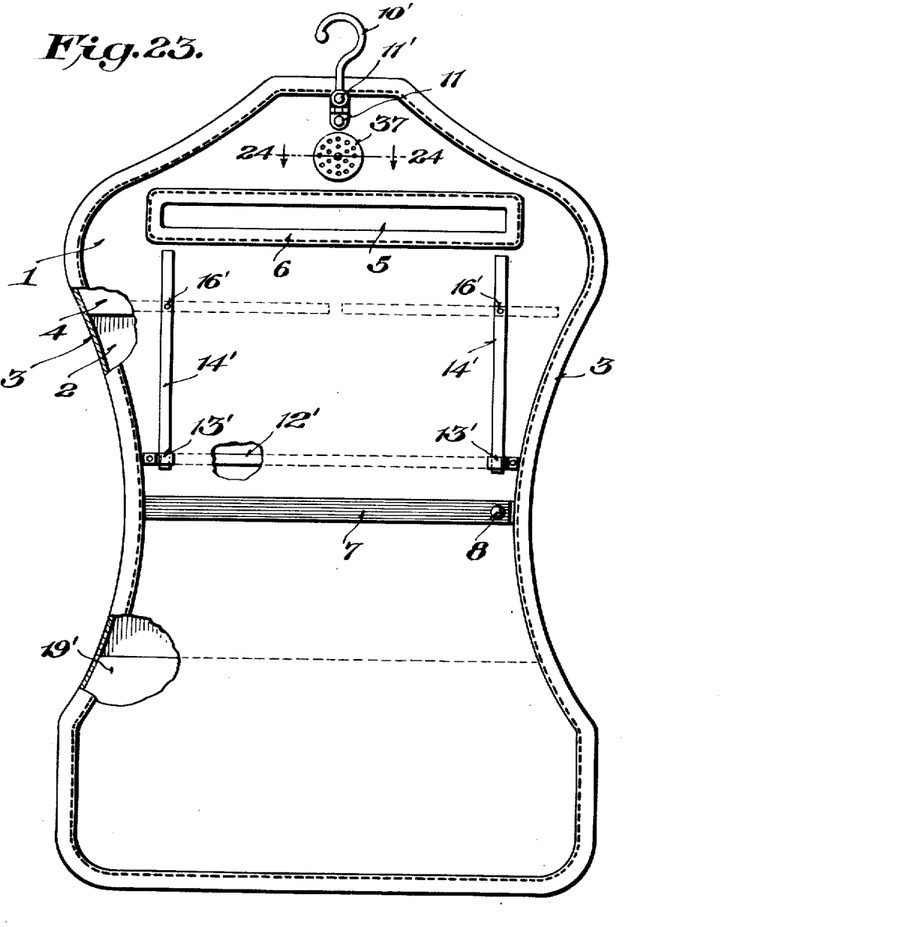
Figure 23 is a view similar to Figure 6 but showing the stiffening elements arranged for either single folding or double folding.
Figure 24:
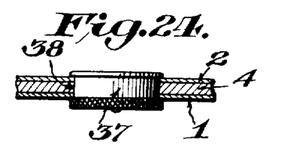
Figure 24 is an enlarged fragmentary sectional view taken on line 24—24 of Figure 23.

To enable the folding of the combined garment form and hanger in a single fold or in double folds I have made the arrangement shown in Figure 23, wherein the neck and shoulder portion of the device is stiffened by an internal stiffener member 4, which is much shorter than the stiffener element 4 in Figure 1 and similar to the stiffener member 4 in Figure 4, and occupies the shoulder and neck portion only of the device. The lower portion of the device may have an internal stiffener 19' similar to that shown and described in Figure 11, while the intermediate portion of the device between the stiffener elements 4 and 19' is flexible. As thus far described it will be understood that the device may be folded along the bottom edge of the upper stiffener element 4, and along the upper edge of the stiffener element 19', whereby double folding of the device may be accomplished. To stiffen the upper half of the device so that it may be given a single fold at about the middle of the device, there is provided a transverse stiffener rod 12', preferably included between the front member 1 and the back member 2 of the device. This rod will stiffen the device transversely but will not interfere with the folding thereof. Disposed above the transverse stiffener bar 12 are the upright stiffener bars 14', each of which is pivoted intermediate of its ends at 16' to the upper portion of the combined form and hanger which is stiffened by the stiffener element 4. Suitable clips 13', corresponding to the offset ends 13, see Figure 10, of the stiffener bar 12, are provided upon the face of the device so as to receive the lower ends of the upright stiffener bars 14' between the clips and the adjacent face of the device. In the positions of the upright stiffener bars 14', as shown in Figure 23, the upper portion of the device from the transverse stiffener bar 12' to the top of the device will be stiffened, so that in folding the device it can be given a single fold at or below the bottom edge of the cross bar 12'. By disengaging the lower ends of the stiffener bars 14' from the clips 13' and swinging them upwardly upon their pivotal connection 16' into the positions shown by dotted lines transversely of the device and at or slightly above the lower edge of the internal stiffener element 4 the device may then be folded along the lower edge of the stiffener element 4 as well as along the upper edge of the lower stiffener element 19'. It will here be noted that the upright stiffener bars 14' lie entirely below the garment receiving slot 5, so as not to interfere with the latter in either of the adjusted positions of the bars. In Figures 6, 7, and 8, the stiffener bars 14 have been illustrated as extending above the garment receiving slot 5 so as to stiffen the device all the way up to the top edge thereof. Pivots 16 have been shown at the upper extremities of the stiffener bars 14 so that when folded the bars lie above the slot 5. It is, of course, apparent that the pivots 16 may be located, in Figures 6, 7 and 8, below the slot 5 so that when folded the stiffener bars 14 may lie below the slot. At any event the upright stiffener bars should be mounted so that when folded they will not extend across and obstruct the slot 5.

The device may be provided with an insecticide container, such as shown at 37, mounted in an opening 38 in the stiffened upper portion of the device. This container may be of any desired size, shape and form and may have a perforate cap rotatable to open and close the perforations, thereby to permit the escape of insecticide fumes from the container.

What is claimed is:

1. A garment form comprising a thin flat sheet body member having an upper stiff portion shaped at its top to provide a central chest portion and opposite shoulder portions, a lower or skirt portion depending from the upper portion and capable of being folded over upon the shoulder and chest portion along the lower edge thereof, said stiff chest portion of the body member having a garment receiving slot extending transversely thereof, and a garment retaining strap terminally secured to the body member and extending transversely thereof below the slot.

2. A garment form comprising a thin flat sheet body member having an upper stiff portion shaped at its top to provide a central chest portion and opposite shoulder portions, a lower or skirt portion depending from the stiff portion and capable of being folded over upon the stiff shoulder and chest portion along the lower edge thereof, said stiff chest portion of the body member having a garment receiving slot extending transversely thereof, and a garment retaining strap terminally secured to the body member and extending transversely thereof below the slot and disposed at the lower edge of the stiff portion.

3. A garment form comprising a thin flat sheet body member having an upper stiff portion shaped at its top to provide a central chest portion and opposite shoulder portions, a lower or skirt portion capable of being folded over upon the stiff shoulder and chest portion along the lower edge of the stiff portion, the chest portion of the body member having a garment receiving slot extending transversely thereof, and a garment retaining strap terminally secured to the body below the slot, one end of the strap having a detachable connection with the body member.

4. A garment form and hanger comprising a body including opposite duplicate sheet body members secured together at their peripheral edges and shaped at the top of the body to provide a chest portion having opposite shoulder portions, and stiffener means provided for the chest portion of the body, the remaining portion of the body capable of being folded over upon the stiff portion along the lower edge thereof.

5. A garment form and hanger comprising a body including opposite duplicate sheet body members secured together at their peripheral edges and shaped at the top of the body to provide a chest portion having opposite shoulder portions, and stiffener means provided for the chest portion of the body, the remaining portion of the body capable of being folded over upon the stiff portion at or below the lower edge thereof, the stiffened portion having a garment receiving slot extending transversely of the body, and a garment retaining strap terminally secured to the body and extending transversely thereof at the lower edge of the stiffened portion.

6. A garment form comprising a body including opposite duplicate sheet body members secured together at their peripheral edges and shaped at the top of the body to provide a chest portion having opposite shoulder portions, and stiffener means lying between the sheet body members and in the chest portion of the body, the remaining portion of the body capable of being folded over upon the stiff portion along the lower edge thereof.

7. A garment form comprising a body including opposite duplicate sheet body members secured together at their peripheral edges and shaped at the top of the body to provide a chest portion having opposite shoulder portions, stiffener means for the chest and shoulder portions of the body, the remaining portion of the body capable of being folded over upon the stiffened portion along the lower edge thereof, the stiffened portion being provided with a garment receiving slot, and the peripheral edge of the body and the walls of the garment receiving slot being provided with a roll binding.

8. A garment form comprising a thin flat sheet body member having an upper portion shaped at its top to provide a central chest portion and opposite shoulder portions, a lower or skirt portion, a stiffener bar extending transversely across the body below the shoulder portion thereof, and opposite upright stiffener bars located above the transverse stiffener bar, the skirt portion of the body capable of being folded over upon the stiffened shoulder and chest portion thereof and along the lower edge of said stiffened portion.

9. A garment form comprising a thin flat sheet body member having an upper portion shaped at its top to provide a central chest portion and opposite shoulder portions, a lower or skirt portion, a stiffener bar extending transversely across the body below the chest portion thereof, and opposite upright stiffener bars located above the transverse bar and pivotally mounted upon the body so as to be swung into a position transversely thereof to permit of the body being rolled into a roll, the skirt portion capable of being folded over upon the stiffened shoulder and chest portion.

10. A garment form comprising a thin flat sheet body member having an upper portion shaped at its top to provide a central chest portion and opposite shoulder portions, a transverse stiffener bar secured to the body below the chest portion thereof and having its ends offset from the body and opposite upright stiffener bars pivoted at their upper ends to the body and having their lower ends displaceably received between the offset ends of the transverse stiffener bar and the body, said upright stiffener bars capable of being swung into positions transversely of the body to permit rolling thereof, the body portion below the transverse stiffener bar capable of being folded over upon the stiffened upper portion of the body.

11. A garment form comprising a thin flat sheet body member having a portion shaped at its top to provide a central chest portion and opposite shoulder portions, and a lower or skirt portion depending from the chest portion, the chest and shoulder portion of the body and the opposite end portion of the skirt being stiffened, the skirt portion between the stiffened portions being flexible, and the stiffened portions capable of being folded along their lines of connection with the intermediate flexible portion.

12. A garment form comprising a thin flat sheet body member having a portion shaped at its top to provide a central chest portion and opposite shoulder portions, and a lower or skirt portion depending from the chest portion, the chest and shoulder portion of the body and the opposite end portion of the skirt being stiffened, the skirt portion between the stiffened portions being flexible, and the stiffened portions capable of being folded along their lines of connection with the intermediate flexible portion, the lower stiffened portion being provided with a pocket member.

13. A garment form comprising a body including opposite duplicate sheet body members secured together at their peripheral edges and shaped at the top of the body to provide a chest portion having opposite shoulder portions, and stiffener elements lying between the sheet body members and disposed in the chest portion and in the lower end portion respectively of the body, the remaining portion of the body between the stiffened portions being flexible, and the stiffened portions capable of being folded over upon the flexible portion.

14. A garment form made from a single blank shaped to provide a chest portion and opposite shoulder portions, a lower or skirt portion depending from and having a flexible connection with the chest portion, and a stiffener portion integral with and of substantially the same size and shape as the top of the chest portion and folded over upon and secured to said chest portion to stiffen the same.

15. A garment form made from a single blank shaped to provide a chest portion and opposite shoulder portions, a flexible lower or skirt portion depending from and having a flexible connection with the chest portion, and a stiffener portion integral with and of substantially the same size and shape as the top of the chest portion and folded over upon and secured to said chest portion to stiffen the same, the stiffened portion having a transverse garment receiving slot therein.

16. A garment form made from a single blank shaped to provide a chest portion and opposite shoulder portions, a lower or skirt portion depending from the chest portion, a stiffener portion integral with the top of the chest portion and folded over upon and secured to said chest portion to stiffen the same, the stiffened portion having a transverse garment receiving slot therein, and a garment retaining strap terminally secured to the body member and extending transversely thereof below the slot.

17. A garment form made from a single blank shaped to provide a chest portion and opposite shoulder portions, a lower or skirt portion depending from and having a flexible connection with the chest portion, a stiffener portion integral with and of substantially the same size and shape as the top of the chest portion and folded over upon and secured to said chest portion to stiffen the same, and a reinforcing fabric included between the folded over portions of the blank.

18. A garment form comprising a thin, flat sheet body member having an upper stiff portion shaped to provide a central chest portion and opposite shoulder portions, a lower or skirt portion capable of being folded around the stiffened portion, a stiffener bar extending transversely across the body substantially midway of the length thereof, and opposite stiffener bars extending longitudinally of the body between the transverse stiffener bar and the stiffened upper portion of the body, the longitudinal stiffener bars being shiftable into positions transversely of the body.

19. A garment form comprising a thin, flat sheet body member having an upper stiff portion shaped to provide a central chest portion and opposite shoulder portions, a lower or skirt portion capable of being folded around the stiffened portion, a stiffener bar extending transversely across the body substantially midway of the length thereof, and opposite stiffener bars extending longitudinally of the body between the transverse stiffener bar and the stiffened upper portion of the body, said longtudinal stiffener bars being pivotally connected to the stiffened upper portion of the body and capable of being turned into positions transversely of the body.

20. A garment form comprising a thin, flat sheet body member having an upper portion shaped to provide a central chest portion and opposite shoulder portions, the chest and shoulder portions being stiff, a lower or skirt portion depending from the stiff shoulder portion, the stiff shoulder portion being provided with a transversely disposed garment receiving slot, a transverse stiffener bar extending transversely across the body below the stiff shoulder portion thereof, and opposite longitudinal stiffener bars extending from the transverse stiffener bar substantially to the garment receiving slot and pivoted between their ends to the stiff shoulder portion of the body and capable of being turned into positions transversely of the body across the stiff portion thereof.

21. A garment form comprising a body, including opposite, duplicate, sheet body members secured together at their peripheral edges and shaped at the top of the body to provide a chest portion having opposite shoulder portions, stiffener elements lying between the sheet body members and disposed in the chest portion and in the lower end portion respectively of the body, the remaining portion of the body between the stiffened portions being flexible, a transverse stiffener bar lying between the body members and disposed substantially between the opposite ends of the body, opposite longitudinal stiffener bars upon the exterior of the body and extending from the transverse bar upwardly to and overlapping the lower portion of the stiff upper part of the body, each longitudinal bar being pivoted between its ends to the stiff top portion of the body and capable of being turned into a transverse position across the stiff part of the body, and clips provided upon the body to detachably retain the lower ends of the longitudinal stiffener bars when in their longitudinal positions.

JAMES W. LIKLY.

CERTIFICATE OF CORRECTION.

Patent No. 1,951,985.  March 20, 1934.

JAMES W. LIKLY.

It is hereby certified that error appears in the printed specification of the above numbered patent requiring correction as follows: Page 5, line 143, claim 15, strike out the word "flexible"; and that the said Letters Patent should be read with this correction therein that the same may conform to the record of the case in the Patent Office.

Signed and sealed this 15th day of May, A. D. 1934.

Bryan M. Battey (Seal)  Acting Commissioner of Patents.

16. A garment form made from a single blank shaped to provide a chest portion and opposite shoulder portions, a lower or skirt portion depending from the chest portion, a stiffener portion integral with the top of the chest portion and folded over upon and secured to said chest portion to stiffen the same, the stiffened portion having a transverse garment receiving slot therein, and a garment retaining strap terminally secured to the body member and extending transversely thereof below the slot.

17. A garment form made from a single blank shaped to provide a chest portion and opposite shoulder portions, a lower or skirt portion depending from and having a flexible connection with the chest portion, a stiffener portion integral with and of substantially the same size and shape as the top of the chest portion and folded over upon and secured to said chest portion to stiffen the same, and a reinforcing fabric included between the folded over portions of the blank.

18. A garment form comprising a thin, flat sheet body member having an upper stiff portion shaped to provide a central chest portion and opposite shoulder portions, a lower or skirt portion capable of being folded around the stiffened portion, a stiffener bar extending transversely across the body substantially midway of the length thereof, and opposite stiffener bars extending longitudinally of the body between the transverse stiffener bar and the stiffened upper portion of the body, the longitudinal stiffener bars being shiftable into positions transversely of the body.

19. A garment form comprising a thin, flat sheet body member having an upper stiff portion shaped to provide a central chest portion and opposite shoulder portions, a lower or skirt portion capable of being folded around the stiffened portion, a stiffener bar extending transversely across the body substantially midway of the length thereof, and opposite stiffener bars extending longitudinally of the body between the transverse stiffener bar and the stiffened upper portion of the body, said longtudinal stiffener bars being pivotally connected to the stiffened upper portion of the body and capable of being turned into positions transversely of the body.

20. A garment form comprising a thin, flat sheet body member having an upper portion shaped to provide a central chest portion and opposite shoulder portions, the chest and shoulder portions being stiff, a lower or skirt portion depending from the stiff shoulder portion, the stiff shoulder portion being provided with a transversely disposed garment receiving slot, a transverse stiffener bar extending transversely across the body below the stiff shoulder portion thereof, and opposite longitudinal stiffener bars extending from the transverse stiffener bar substantially to the garment receiving slot and pivoted between their ends to the stiff shoulder portion of the body and capable of being turned into positions transversely of the body across the stiff portion thereof.

21. A garment form comprising a body, including opposite, duplicate, sheet body members secured together at their peripheral edges and shaped at the top of the body to provide a chest portion having opposite shoulder portions, stiffener elements lying between the sheet body members and disposed in the chest portion and in the lower end portion respectively of the body, the remaining portion of the body between the stiffened portions being flexible, a transverse stiffener bar lying between the body members and disposed substantially between the opposite ends of the body, opposite longitudinal stiffener bars upon the exterior of the body and extending from the transverse bar upwardly to and overlapping the lower portion of the stiff upper part of the body, each longitudinal bar being pivoted between its ends to the stiff top portion of the body and capable of being turned into a transverse position across the stiff part of the body, and clips provided upon the body to detachably retain the lower ends of the longitudinal stiffener bars when in their longitudinal positions.

JAMES W. LIKLY.

CERTIFICATE OF CORRECTION.

Patent No. 1,951,985.  March 20, 1934.

JAMES W. LIKLY.

It is hereby certified that error appears in the printed specification of the above numbered patent requiring correction as follows: Page 5, line 143, claim 15, strike out the word "flexible"; and that the said Letters Patent should be read with this correction therein that the same may conform to the record of the case in the Patent Office.

Signed and sealed this 15th day of May, A. D. 1934.

Bryan M. Battey (Seal)  Acting Commissioner of Patents.